(12) United States Patent
El-Dasher et al.

(10) Patent No.: US 9,308,583 B2
(45) Date of Patent: Apr. 12, 2016

(54) SYSTEM AND METHOD FOR HIGH POWER DIODE BASED ADDITIVE MANUFACTURING

(71) Applicant: Lawrence Livermore National Security, LLC, Livermore, CA (US)

(72) Inventors: Bassem S. El-Dasher, Livermore, CA (US); Andrew Bayramian, Manteca, CA (US); James A. Demuth, Mountain View, CA (US); Joseph C. Farmer, Tracy, CA (US); Sharon G. Torres, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 294 days.

(21) Appl. No.: 13/785,484

(22) Filed: Mar. 5, 2013

(65) Prior Publication Data

US 2014/0252687 A1   Sep. 11, 2014

(51) Int. Cl.
*B22F 3/00*  (2006.01)
*B22F 3/105* (2006.01)
*C22C 32/00* (2006.01)

(52) U.S. Cl.
CPC ....... *B22F 3/1055* (2013.01); *B22F 2003/1056* (2013.01); *C22C 32/0026* (2013.01); *Y02P 10/295* (2015.11)

(58) Field of Classification Search
CPC ........... B22F 3/1055; B22F 2003/1056; B29C 67/0077
See application file for complete search history.

(56) References Cited

U.S. PATENT DOCUMENTS

| 4,247,508 | A | 1/1981 | Housholder |
| 5,236,637 | A | 8/1993 | Hull |
| 4,247,508 | B1 | 10/1996 | Housholder |
| 7,088,432 | B2 | 8/2006 | Zhang |
| 2005/0083498 | A1* | 4/2005 | Jeng ....................... G03F 7/0035 355/53 |
| 2009/0020901 | A1* | 1/2009 | Schillen .............. B29C 67/0051 264/31 |

OTHER PUBLICATIONS

Helbert, John N. "Handbook of VLSI microlithography". 2d Ed., Hoyes Publications, New York, NY (2001).
Tolochko, N. K., Laoui, T., Khlopkov, Y. V., Mozzharov, S. E., Titov, V.I., and Ignatiev, M. B., "Absorptance of powder materials suitable for laser sintering". Rapid Prototyping Journal, vol. 6, No. 3 (2000), pp. 155-160.

* cited by examiner

*Primary Examiner* — James Sanders
(74) *Attorney, Agent, or Firm* — Harness, Dickey & Pierce, PLC (57) ABSTRACT

A system is disclosed for performing an Additive Manufacturing (AM) fabrication process on a powdered material forming a substrate. The system may make use of a diode array for generating an optical signal sufficient to melt a powdered material of the substrate. A mask may be used for preventing a first predetermined portion of the optical signal from reaching the substrate, while allowing a second predetermined portion to reach the substrate. At least one processor may be used for controlling an output of the diode array.

10 Claims, 6 Drawing Sheets

Assumptions:
- Solid emissivity of 0.3
- Molten emissivity of 0.1
- 1cm thick base plate with outer edge held at 25C
- Environment at 25C
- 30um diameter powder in a 90um thick powder layer

| Material | Avg. Power Flux Required [W/cm²] |
|---|---|
| Al | 12 |
| Fe | 170 |
| Ti | 220 |
| W | 2,900 |

SYSTEM AND METHOD FOR HIGH POWER DIODE BASED ADDITIVE MANUFACTURING

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to Additive Manufacturing systems and techniques for making three dimensional articles and parts, and more particularly to a system and method for performing Additive Manufacturing using a high power diode system.

BACKGROUND

The statements in this section merely provide background information related to the present disclosure and may not constitute prior art.

Additive Manufacturing ("AM"), also referred to as 3D printing, is a manufacturing technique in which material is added sequentially, layer by layer, in order to build a part. This is in contrast to traditional machining, where the part starts as a block of material that is then whittled down to the final desired shape. With AM fabrication, a directed power source is used to agglomerate material (typically powder) into a final, near net-shape article. Three dimensional articles are manufactured one layer at a time as an assemblage of two-dimensional sections. One important advantage of AM fabrication is that complex shapes (e.g. parts with internal features) can be realized. Another important advantage is that the material required is limited to that used to form the final part. Thus, AM fabrication has the benefit of very little material loss. This is especially important for expensive/tightly controlled materials.

The use of AM for metal fabrication is relatively recent. Historically, plastics have been the focus of commercial systems that employ AM. Nevertheless, the use of metals with AM is highly commercially and technologically important because the majority of engineered structures rely heavily on metals. Metal AM requires a relatively high power, highly focused laser beam (typically on the order of 100 W-1000 W) to melt, fuse, and/or sinter metallic powder. The metal powder is typically placed in a powder bed during the AM process. The laser beam is rastered along the powder surface to make a two-dimensional section per pass. Once each layer is completed, the powder bed retracts and new powder is layered on top of the just-completed layer. Considering that a typical layer thickness is only about 50-100 microns, it can be seen how this rastering is the most time consuming step. This is the principal reason why objects that would only take two to three hours to machine using traditional machining methods may take up to eight hours or more using AM. Moreover, due to the necessity of rastering the laser beam, the maximum part size can be limited. Presently a 25 cm×25 cm area part size is the largest part size that can be made with an AM technique that involves rastering the laser beam. Accordingly, there is a strong desire to reduce the time required to manufacture objects, and particularly metal objects, using AM. One important challenge that the present disclosure addresses is overcoming this relatively slow speed necessitated by the raster scanning operation employed with a conventional AM fabrication process.

SUMMARY

In one aspect the present disclosure relates to a system for performing an Additive Manufacturing (AM) fabrication process on a powdered material forming a substrate. The system may comprise a diode array for generating an optical signal sufficient to melt or sinter a powdered material of the substrate. A mask may be used for preventing a first predetermined portion of the optical signal from reaching the substrate, while allowing a second predetermined portion to reach the substrate. At least one processor may be used for controlling an output of the diode array.

In another aspect the present disclosure relates to a system for performing an Additive Manufacturing (AM) fabrication process on a powdered material forming a substrate. The system may comprise a diode array for generating a pulsed optical signal sufficient in optical intensity to melt or sinter a powdered material of the substrate. A mask may be interposed between the diode array and the substrate for preventing a first predetermined portion of the pulsed optical signal from reaching the substrate, while allowing a second predetermined portion to reach the substrate. The mask may be configured to be controlled and addressable by a processor to electronically enable selected subportions of the substrate to be masked off. A processor may be used for electronically controlling the mask.

In still another aspect the present disclosure relates to a method for performing Additive Manufacturing (AM). The method may comprise irradiating a powdered layer of a substrate using a pulsed optical signal sufficient to irradiate at least a substantial portion of an entire two dimensional layer within which the substrate is positioned. A mask may be used to selectively block a first subportion of the pulsed optical signal from reaching the first layer of the substrate. A second layer of powdered material may be placed over the first layer. The second layer may be irradiated using the pulsed optical signal while using the mask to selectively block a second subportion of the pulsed optical signal from reaching the second layer of the substrate.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way. In the drawings.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
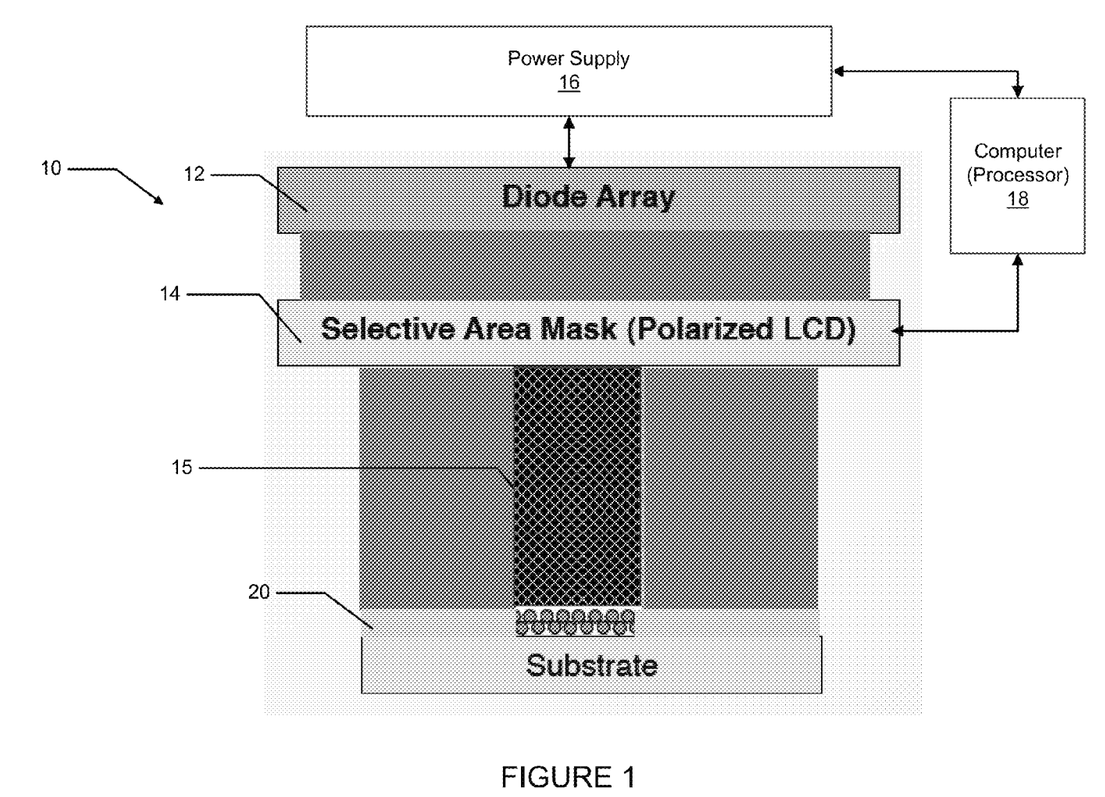
FIG. 1 is a diagrammatic view of one embodiment of the present system and method for performing an Additive Manufacturing ("AM") fabrication process using a high power diode array and a mask.

Referring to FIG. 1 a system 10 is shown in accordance with one embodiment of the present disclosure for performing an Additive Manufacturing ("AM") fabrication process. The system 10 may include a high power diode array 12 and a computer controlled, selective area mask 14 (hereinafter simply "mask 14"). A suitable power supply 16 may be used for providing electrical power to the diode array 12. A computer 18 or other suitable form of processor or controller may be used for controlling the power supply 16 to control the on/off application of power to the diode array 12 as well as selectively (i.e., digitally) controlling the mask 14 and shaping or focusing the optical beam. Optionally, separate processors or computers may be used to control the diode array 12 and the mask 14. Selectively electronically controlling the mask 14 with the computer 18 allows the optical beam from the diode array 12 to be prevented from reaching specific selected portions of powder that forms a substrate 20 (i.e., powder bed) so that those portions are irradiated by the beam. In FIG. 1 portion 15 is cross hatched to represent a portion of the output from the diode array 12 that does not reach the powdered material of the substrate 20.

Figure 3:
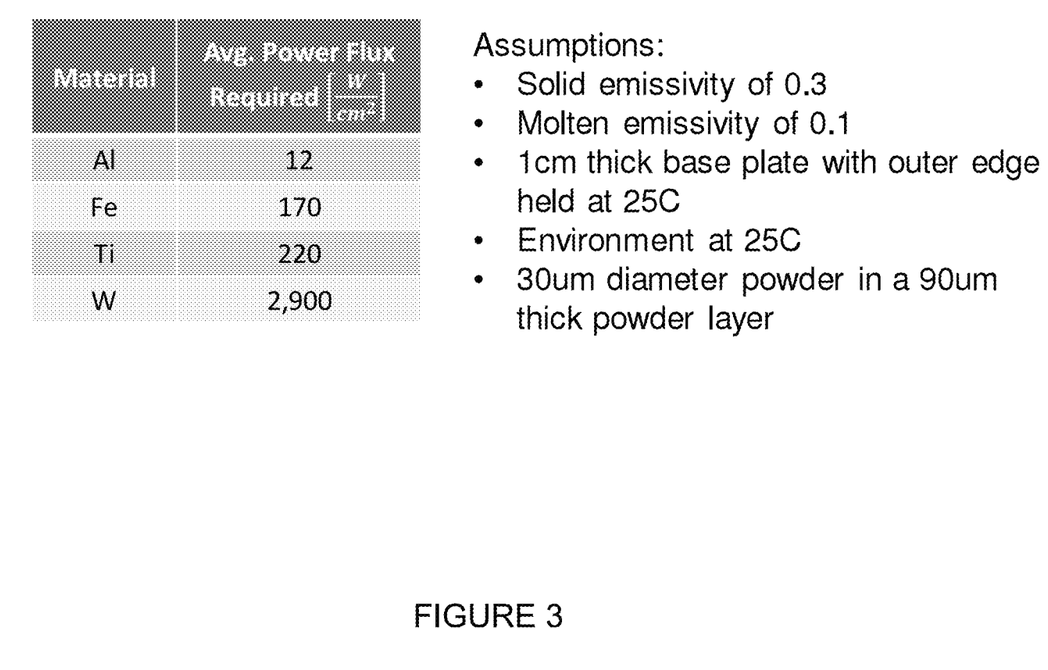
FIG. 3 is a chart illustrating the average power flux required to melt various types of metals.
Figure 4:
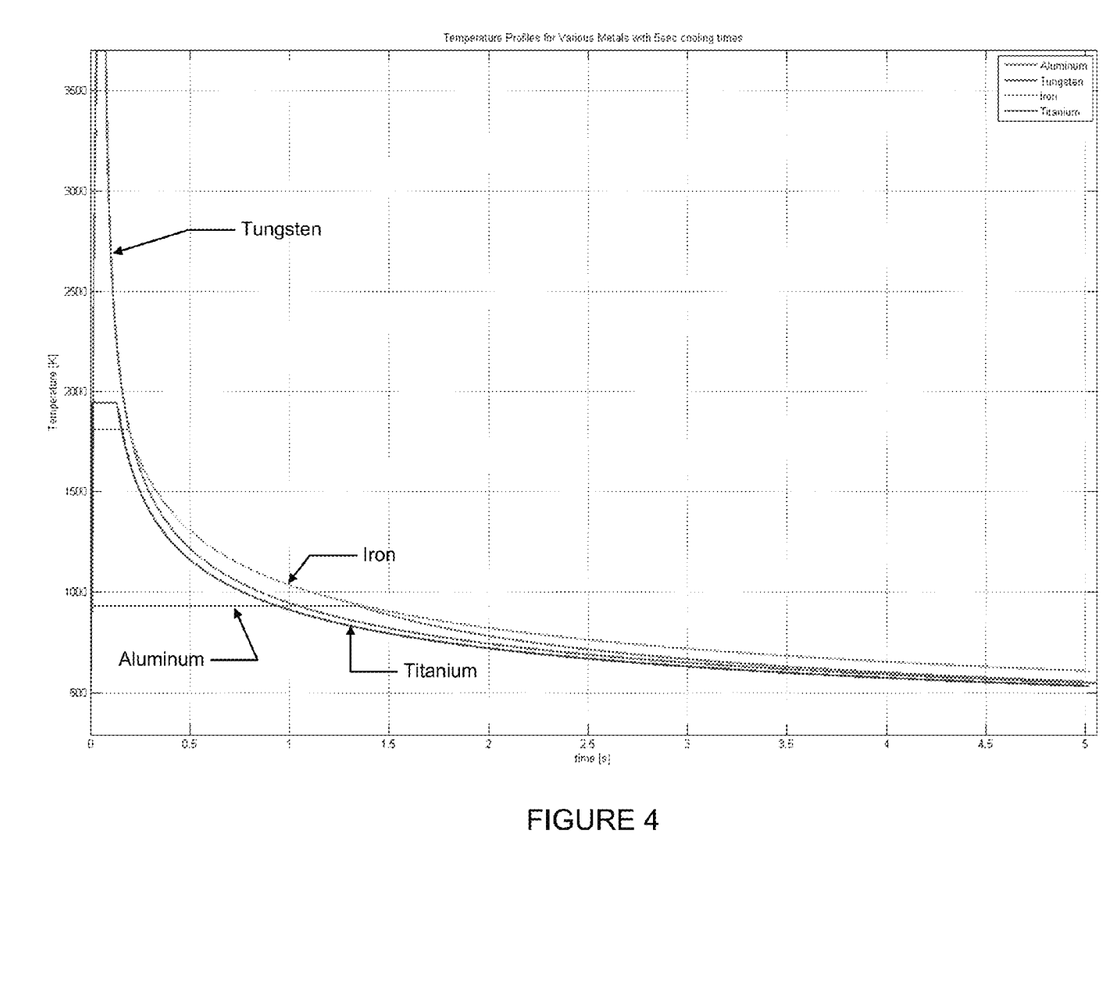
FIG. 4 is a graph that shows a plurality of curves representing various temperatures required to melt various materials, along with the time required to melt each material.

In one preferred form the diode array 12 may comprise a single large diode bar. Alternatively a plurality of diode bars located adjacent one another may be used to form the diode array 12. In one preferred form the diode array may be made up of arrays of diode bars each being about 1 cm×0.015 cm to construct a 25 cm×25 cm diode array. However, any number of diode bars may be used, and the precise number and configuration may depend on the part being constructed as well as other factors. Suitable diode bars for forming the diode array 12 are available from Lasertel of Tucson, Ariz., Oclaro Inc. of San Jose, Calif., nLight Corp. of Vancouver, Wash., Quantel Inc. of New York, N.Y., DILAS Diode Laser, Inc. of Tucson, Ariz., and Jenoptik AG of Jena, Germany, as well as many others. The diode array 12 is able to provide a minimum power density of about 10 kW/cm$^2$ and maximum>100 kW/cm$^2$ at two percent duty cycle. This makes it feasible to generate sufficient optical power to melt a wide variety of materials. FIG. 3 provides a table of the average power flux that has been calculated to melt various types of materials. FIG. 4 shows a graph that illustrates the effectiveness of the diode array 12 on a variety of metal powders (i.e., Aluminum, Titanium, Iron and Tungsten), at a power flux sufficient to melt all the materials. The calculations to obtain the graphs shown in FIG. 4 were performed in MATLAB with conductive and radiative losses taken into account. A conservative 30% absorptivity was assumed along with a powder layer thickness of 100 μm.

It will also be appreciated that a significant advantage of using a diode array comprised of one or more diode bars is that such an assembly is readily scalable. Thus, diode arrays of various sizes can be constructed to meet the needs of making a specific sized part. For example, the diode array 12 may be constructed to have a one square meter area, which would allow correspondingly large scale components to be constructed through an AM fabrication process, provided of course that a suitably sized powder bed is available to support fabrication of the part. Another significant advantage is that the system 10 can be integrated into existing AM fabrication systems with the added benefit of no moving parts. The system 10 allows for the AM fabrication of traditionally difficult to fabricate and join metal such as ODS (oxide dispersion strengthened) steels or any alloy traditionally formed using solid state (i.e. non-melt) processing techniques.

Figure 2:
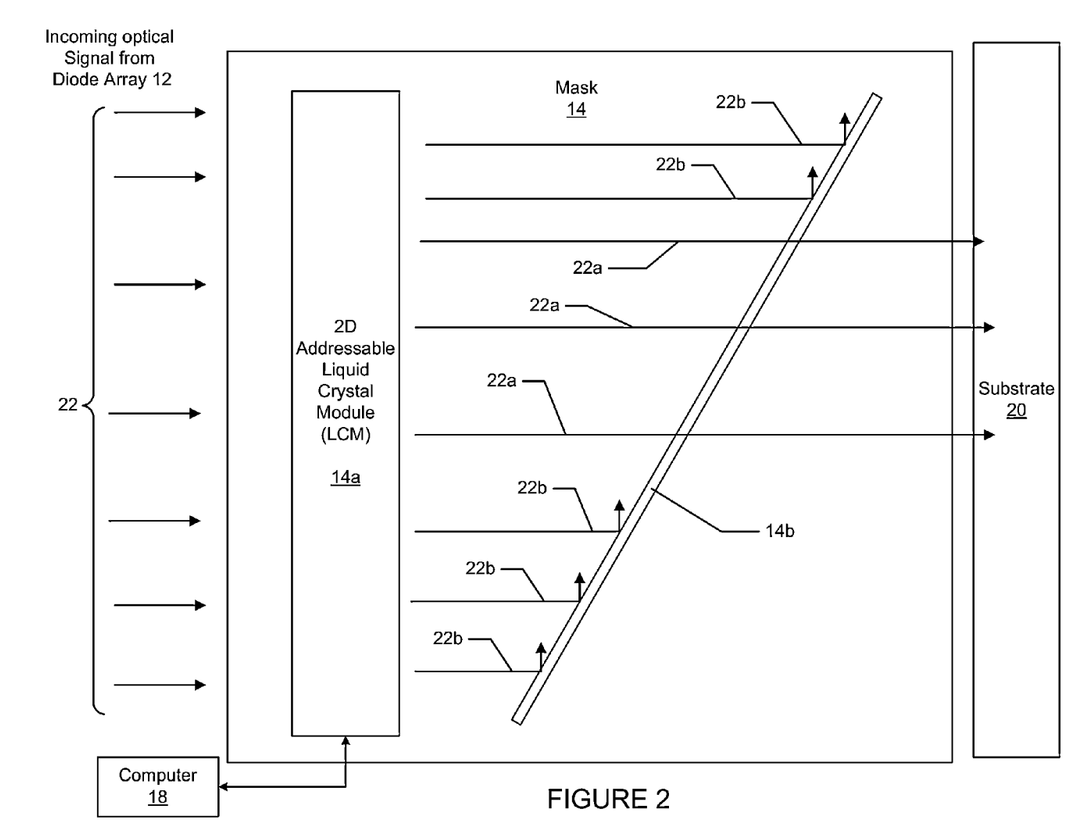
FIG. 2 is a diagrammatic side view of the system of FIG. 1 showing how a portion of the optical rays from the diode array are reflected by a polarizing mirror during the fabrication process to prevent them from reaching the substrate.

Referring to FIG. 2, in one preferred form the mask 14 forms a "liquid crystal polarization rotator" comprised of a liquid crystal module (LCM) 14a and a polarizing element 14b, in this example a polarizing mirror (hereinafter "polarizing mirror" 14b). The polarizing mirror 14b directs the light defined by the liquid crystal polarization rotator and shapes the optical pattern that irradiates the substrate 20. The LCM 14a that helps to form the mask 14 may be made up of one or more two dimensional, electronically (i.e., digitally) addressable arrays of pixels. Liquid crystal polarizers are commercially available and form two dimensional arrays of addressable pixels which work by changing the polarity of an incoming photon that is then rejected by a polarization element. However, with the system 10, the polarizing element 14b may form a discrete component of the mask 14 that may be used to help focus and/or shape the optical signal.

In FIG. 2 the mask 14 receives light 22 being output from the diode array 12 as the light irradiates the LCM 14a. Pixels of the LCM 14a are independently addressed using the computer 18 to reject light at specific select areas of the substrate 20. Using the LCM 14a and the polarizing mirror 14b to form the mask 14 enables the light generated by the diode array 12 to be controllably directed onto only selected areas of the substrate 20 as needed. In FIG. 2 light indicated by lines 22a is able to pass through the polarizing mirror 14b while light indicated by lines 22b is rejected by the polarizing mirror. An important advantage of using a computer controlled LCM 14a is that only a very small amount of optical energy is absorbed into the polarizing mirror 14b, thus making it feasible to prevent damage to the mirror.

During an actual AM fabrication operation, a first layer of powdered material may be acted on by the system by pulsing the diode array 12 to melt selected portions (or possibly the entire portion) of the first layer. A subsequent (i.e., second) layer of powdered material may then be added over the layer just acted on by the system 10 and the process would be repeated. The diode array 12 may be pulsed to melt one or more selected subportions (or possibly the entirety) of the second layer of material. With each layer the system 10 electronically controls the pixels of the mask 14 to selectively block specific, predetermined portions of the substrate 20 from being irradiated by the pulsed optical signal from the diode array 12. This process is repeated for each layer, with the computer 18 controlling the mask 14 so that, for each layer, one or more selected subportions (or possibly the entirety) of the powdered material is blocked by the mask 14 from being exposed to the pulsed optical signal. Preferably, an entire two dimensional area of each layer is melted or sintered at once by pulsing the diode array 12. However, it is just as feasible to raster scan the diode array 12 over the two dimensional area in the event the entire two dimensional area cannot be completely irradiated by the diode array.

An alternative to the addressable mask 14 is a non-addressable mask. A non-addressable mask may be a precision cut piece of metal (e.g., tungsten) that would simply block portions of the light beam. While such a machined mask can be used to build simple geometries, the full potential of the system 10 described herein will be maximized if an addressable mask such as mask 14 is used.

Figure 5:
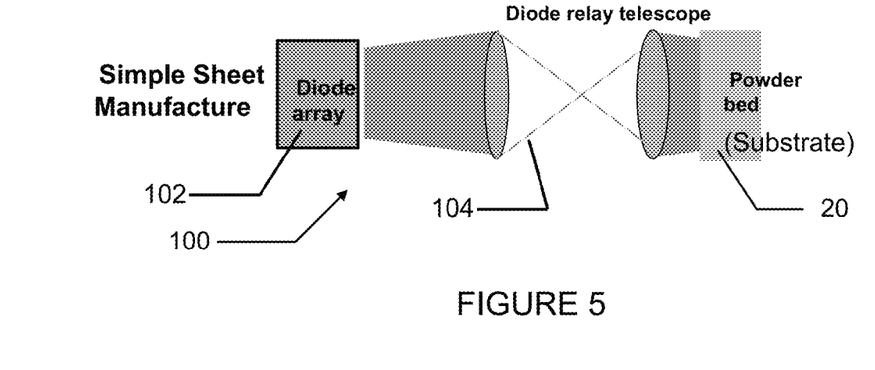
FIG. 5 shows an alternative form of the system of the present disclosure in which distinct "tiles" (predetermined areas) corresponding to pixels of the substrate are digitally controlled during the AM fabrication process.
Figure 6:
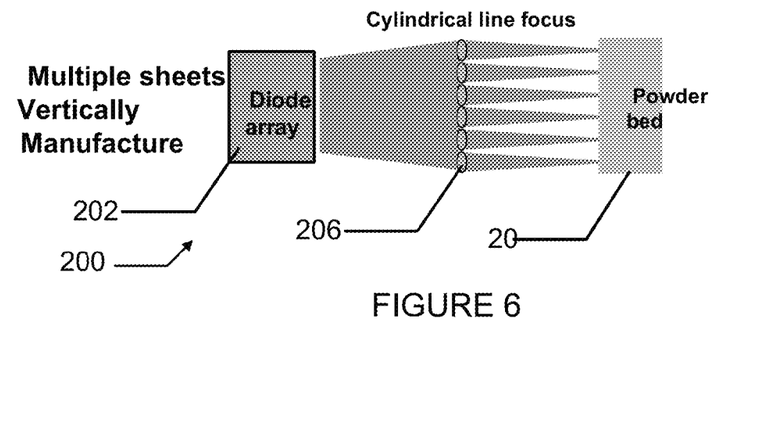
FIG. 6 is another alternative form of the system of the present disclosure in which a plurality of focusing lenses are used to simultaneously focus the output from the diode array onto specific sections of the substrate for simultaneously melting distinct, separate sheets of material.

Referring to FIGS. 5 and 6, two alternative systems 100 and 200 in accordance with additional implementations of the present disclosure are shown. System 100 includes a diode array 102 and a diode relay telescope 104. The diode relay telescope 104 is used to provide digital control over "tiles" within an array image to the "pixels" in the substrate 20 (powder bed). FIG. 6 illustrates a system 200 having a diode array 202 and a plurality of focusing lenses 206 that are used to focus the optical energy from the array onto a corresponding plurality of "sheets" representing the substrate 20.

The systems 10, 100 and 200 are able to melt and sinter each layer in a single "pass" or, put differently, in a single operation by pulsing the diode array 12. The need to raster scan an optical beam dozens, hundreds or more times, back and forth across a surface, is therefore eliminated. This significantly reduces the time required to melt and sinter each layer of powder material during the AM fabrication process.

Figure 7:
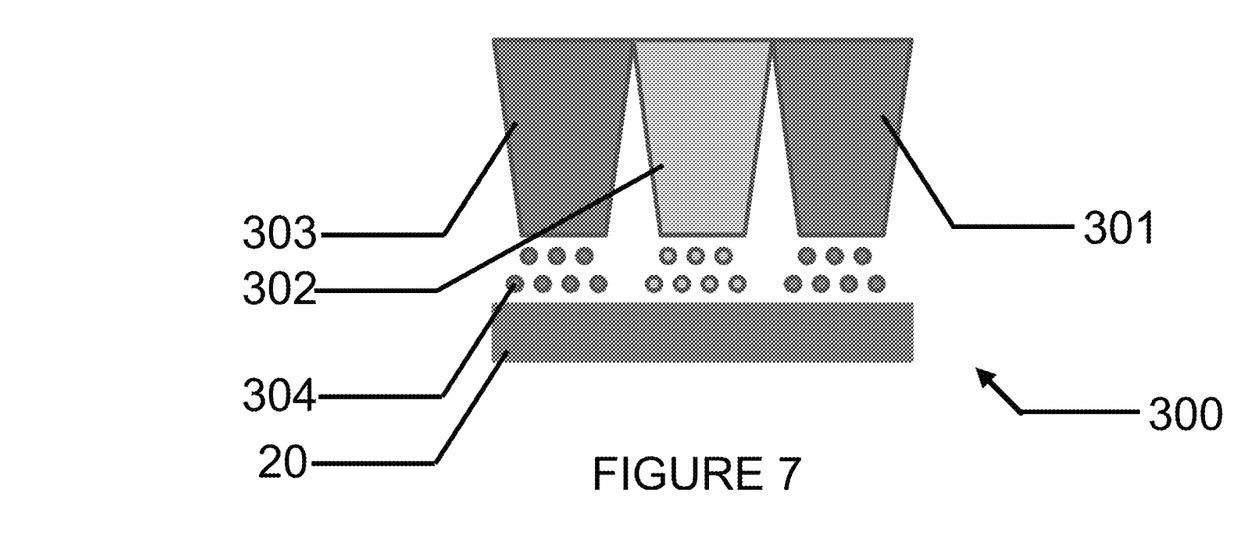
FIG. 7 is a diagrammatic side view of a method of deposition of different material types in powder form prior to illumination by diode array generated light to melt/sinter the dissimilar powders together.

Referring to FIG. 7, a method of deposition of different material types in powder form is illustrated in system 300. Nozzles 301, 302, and 303 are capable of depositing layers of different material powders 304 onto the substrate 20. The nozzle heads 301, 302 and 303 are rastered across the part surface covering it with material addressed by a programmable source. Both the irradiation from the diode array 12 and operation of the mask 14, as described in connection with the system 10, can be controlled such that each material deposited from the nozzles 301, 302 and 303 receives the correct amount of optical energy for a controlled melt or sintering.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A system for performing an Additive Manufacturing (AM) fabrication process on a powdered material forming a substrate, the system comprising:
    a diode array for generating an optical signal sufficient to melt or sinter a powdered material of the substrate;
    a mask for receiving the optical signal generated by the diode array, the mask forming a liquid crystal polarization rotator, the liquid crystal polarization rotator including a liquid crystal module and a polarizer, wherein the liquid crystal module operates to receive and to rotate a first portion of the optical signal passing therethrough while allowing a second portion of the optical signal to pass therethrough without being rotated, and wherein the polarizer operates to reject one of the first or second portions of the optical signal received from the liquid crystal module, and thus to prevent the one of the first or second portions from reaching the substrate, while the polarizer allows the other one of the first or second portions of the optical signal to reach the substrate, the liquid crystal module of the mask having a plurality of pixels arranged in a two dimensional pattern that are individually controlled to enable the mask to mask off one or more selected areas of a specific layer of the powdered material of the substrate, and wherein the mask absorbs substantially no optical energy from the optical signal; and
    at least one processor controlling an output of the diode array and assisting in controlling operation of the mask such that only selected one of the pixels are controlled to enable portions of the optical signal passing through the liquid crystal polarization rotator to be rotated to thus form the first portion of the optical signal.

2. The system of claim 1, wherein the diode array comprises a plurality of diode bars.

3. The system of claim 2, wherein the diode array is configured to provide a power density of at least about 10 kW/cm$^2$ at a two percent duty cycle.

4. The system of claim 1, wherein the liquid crystal module comprises a computer controllable liquid crystal module configured to be digitally controlled by the processor.

5. The system of claim 1, wherein the polarizer comprises a polarizing mirror.

6. A system for performing an Additive Manufacturing (AM) fabrication process on a powdered material forming a substrate, the system comprising:
    a diode array for generating a pulsed optical signal sufficient in optical intensity to melt a powdered material of the substrate;
    a mask forming a liquid crystal polarization rotator having a liquid crystal module and a polarizer interposed between the diode array and the substrate, the liquid crystal polarization rotator operating to rotate a first portion of the pulsed optical signal passing therethrough while allowing a second portion of the pulsed optical signal to pass therethrough without being rotated, and the polarizer operating to reject one of the first or second portions of the pulsed optical signal, thus preventing the one of the first or second portions from reaching the substrate, while allowing the other one of the first or second portions of the pulsed optical signal to reach the substrate, the liquid crystal module of the mask including a plurality of pixels arranged in a two dimensional pattern that are individually controlled to enable the mask to simultaneously mask off one or more selected areas of a specific layer of the powdered material of the substrate, and wherein the mask absorbs substantially no optical energy from the pulsed optical signal; and
    a processor for determining which one or more pixels of the mask need to be controlled in a manner such that only select portions of the optical signal are rotated to form the first portion of the optical signal, the mask thus operating to pass the optical signal from the diode array to melt only one or more specific, desired portions of the powdered material.

7. The system of claim 6, wherein:
    the diode array is configured to be electronically controlled; and
    wherein the processor is configured to electronically control the diode array to control on and off operation of the diode array.

8. The system of claim 6, wherein the mask is electronically addressable by the processor to prevent selected areas of the substrate from being exposed to the pulsed optical signal from the diode array.

9. The system of claim 6, wherein the polarizer comprises a polarizing mirror disposed at a 45 degree angle from a plane that the pulsed optical signal from the diode array travels in.

10. The system of claim 6, wherein the diode array is configured to generate a power output of at least about $10^5$ kW/cm² at a duty cycle of about two percent.

* * * * *